Feb. 5, 1946.  S. C. WITHERS, JR  2,394,282
EDUCATIONAL DEVICE
Filed March 31, 1944   2 Sheets-Sheet 1
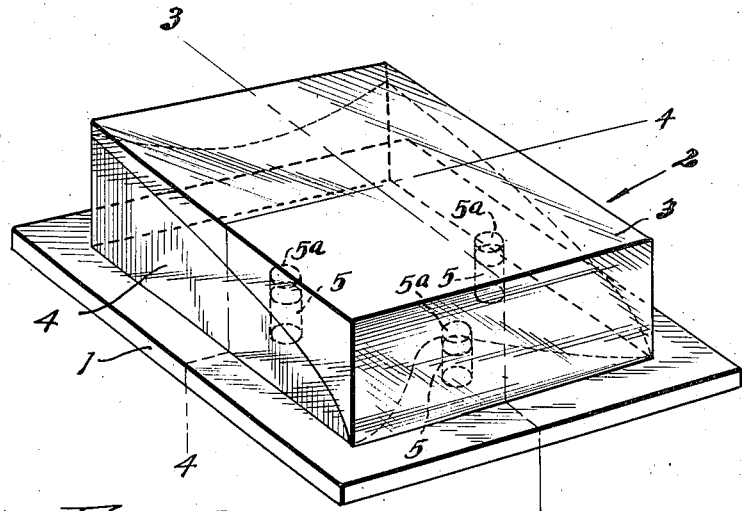
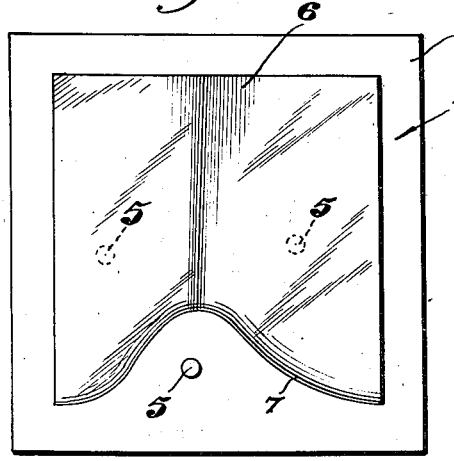
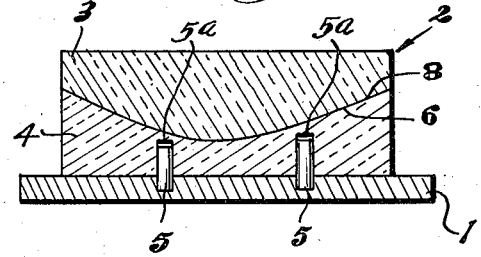
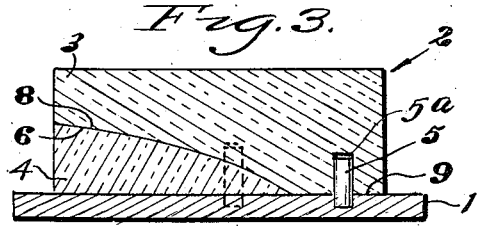
Inventor
Samuel C. Withers, Jr.
By Clarence A. O'Brien
and Harvey B. Jacobson
Attorneys Feb. 5, 1946. S. C. WITHERS, JR 2,394,282
EDUCATIONAL DEVICE
Filed March 31, 1944 2 Sheets-Sheet 2
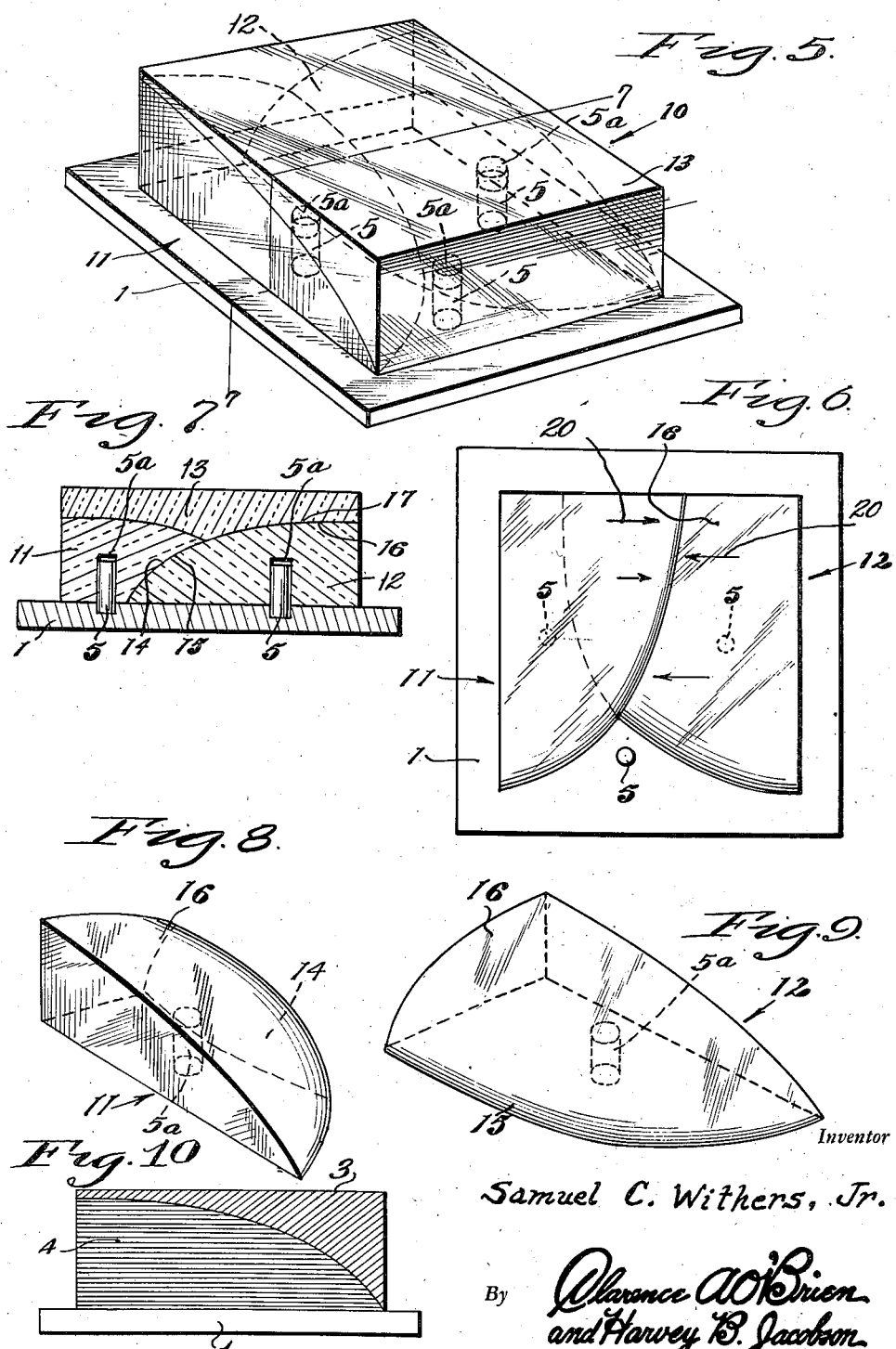

Patented Feb. 5, 1946

2,394,282

UNITED STATES PATENT OFFICE 2,394,282

EDUCATIONAL DEVICE

Samuel C. Withers, Jr., Williamstown, Mass., assignor of one-third to Francis P. Colburn, Burlington, Vt.

Application March 31, 1944, Serial No. 528,940

5 Claims. (Cl. 35—1)

The present invention relates to new and useful improvements in educational devices for use particularly in teaching the science of meteorology, and has for its primary object to provide, in a manner as hereinafter set forth, visual means of novel construction for facilitating the explanation and clarifying the action of air masses, fronts and frontal action.

Other objects of the invention are to provide an educational device of the aforementioned character which will be comparatively simple in construction, strong, durable, compact and which may be produced at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a perspective view of an educational device constructed in accordance with the present invention.

Figure 2 is a top plan view of the device with the upper member omitted.

Figure 3 is a view in longitudinal section through the device.

Figure 4 is a cross sectional view.

Figure 5 is a perspective view of another embodiment of the device.

Figure 6 is a top plan view of the modification with the upper member omitted.

Figure 7 is a cross sectional view through the modified form.

Figures 8 and 9 are perspective views of the lower members of the modification.

Figures 10 is a side elevational view of the device shown in Figure 1 showing sections of different colors.

Referring now to the drawings in detail, it will be seen that reference character 1 designates a base of suitable dimensions and material. Removably mounted on the base 1 is a substantially flat block which is designated generally by reference character 2. It will be observed that the vertical faces of the block 2 are spaced inwardly from the edges of the base 1.

The block 2 is of transparent material and comprises distinctively colored or tinted, complemental upper and lower members or sections 3 and 4, respectively. Removable pins or dowels 5 positioned in suitable holes 5a secure the sections 3 and 4 of the block 2 in position on the base 1.

The lower member 4 of the block 2 comprises a substantially synclinal upper surface 6, the axis of which slopes from one end of said member to a point in spaced relation to its other end, where, as best seen in Figure 3 of the drawings, it merges with the bottom of said member 4, thus leaving a recess or indentation, as at 7, in said other end.

The upper member 3 of the block 2 comprises a lower face 8 which conforms to the top face 6 of the member 4 on which it seats. The lower face 8 of the member 3 further includes, on one end portion, a flat portion 9 which rests on the portion of the base 1 which is within the confines of the recess 7 in the member 4. This is shown to advantage in Figure 3 of the drawings.

In the embodiment of Figures 5 to 9, inclusive, of the drawings, reference character 10 designates generally a substantially flat block which is removably mounted on the base 1. The block 10, which is transparent, includes distinctively colored or tinted lower sections or members 11 and 12 having superimposed thereon an upper member 13. The pins or dowels 5 secure the members 11, 12 and 13 on the base 1.

The lower members 11 and 12 of the block 10 include oppositely beveled, overlapping inner surfaces or faces 14 and 15, respectively. Further, the members 11 and 12, in conjunction with each other, are formed to provide a substantially synclinal upper surface 16, the axis of which slopes longitudinally from one end of the block 10 to a point in inwardly spaced relation to the other end of said block where it merges with the bottom thereof. The upper member 13 includes a lower surface 17 which conforms to the surface 16 on which it seats, together with a flat end portion which rests on the base 1 between the corresponding end portions of the members 11 and 12.

It is thought that the manner in which the device is used will be readily apparent from a consideration of the foregoing, particularly to those familiar with the science of meteorology. Briefly, the lower members of the blocks are positioned on the base 1 and the upper members are superimposed thereon and on said base, all of said members being retained by the pins or dowels 5. The distinctively colored or tinted members (see Figure 10) of the transparent blocks represent air masses of different characteristic shapes and sizes which permit the student to readily visualize the explanation of the instructor. To further clarify the instructor's explanation, wind directions may be indicated on each of the members through the medium of arrows 20 (see Figure 6). Also, isobars may be provided on each of the members.

It is believed that the many advantages of an educational device constructed in accordance with the present invention will be readily understood, and although preferred embodiments of said device are as illustrated and described, it is to be understood that further modifications and changes in the details of construction may be resorted to which will fall within the scope of the invention as claimed.

What is claimed is:

1. A meteorology instruction device comprising a base, a block mounted on the base, said block including a plurality of separable, distinctively colored transparent members adapted to represent air masses of respectively different characteristic shapes, and means for detachably securing each of the members to the base.

2. A meteorology instruction device comprising a substantially flat base, a substantially flat, transparent block removably mounted on the base, said block including a plurality of distinctively colored sections adapted to represent air masses of respectively different characteristic shapes, said sections comprising complemental, overlapping, irregularly-shaped surfaces, and means removably securing the members in position on the base.

3. A meteorology instruction device comprising a transparent block including distinctively colored upper and lower members adapted to represent air masses of respectively different characteristic shapes, said lower member comprising a substantially synclinal upper surface, said upper surface being inclined, the lower surface of the upper member conforming substantially to said upper surface of the lower member and being engaged therewith.

4. A meteorology instruction device comprising a flat base, a substantially flat, transparent block removably mounted on said base, said block including a lower member and further including an upper member superimposed on said lower member and on the base, said lower and upper members being distinctively colored and adapted to represent air masses of respectively different characteristic shapes, the lower member including a substantially synclinal upper surface sloping on its longitudinal axis, the lower surface of the upper member conforming substantially to the shape of said upper surface of the lower member and resting thereon, and dowels in the base engaged in the members for releasably securing said members in position on said base.

5. A meteorology instruction device comprising a flat base, a transparent block removably mounted on the base, said block including a pair of lower members and an upper member superimposed on said lower members and on the base, all of said members being distinctively colored and adapted to represent air masses of respectively different characteristic shapes, the lower members further including oppositely beveled, overlapping inner faces, said lower members, in conjunction with each other, being formed to provide a substantially synclinal upper surface, the upper member conforming substantially to said substantially synclinal surface and resting thereon, and dowels detachably securing the members in position on the base.

SAMUEL C. WITHERS, Jr.